(12) United States Patent
Jones et al.

(10) Patent No.: US 10,919,588 B2
(45) Date of Patent: Feb. 16, 2021

(54) TRACK PIN AND BUSHING RETENTION DESIGN FOR A TRACK CHAIN

(71) Applicant: Caterpillar Inc., Peoria, IL (US)

(72) Inventors: Benjamin Isaac Jones, Bartonville, IL (US); Mircea Dumitru, Washington, IL (US)

(73) Assignee: Caterpillar Inc., Peoria, IL (US)

(*) Notice: Subject to any disclaimer, the term of this patent is extended or adjusted under 35 U.S.C. 154(b) by 295 days.

(21) Appl. No.: 15/903,719

(22) Filed: Feb. 23, 2018

(65) Prior Publication Data

US 2019/0263462 A1 Aug. 29, 2019

(51) Int. Cl.
| | | |
|---|---|---|
| B62D 55/205 | (2006.01) | |
| B62D 55/21 | (2006.01) | |
| B62D 55/32 | (2006.01) | |
| B25B 27/22 | (2006.01) | |

(52) U.S. Cl.
CPC ........... *B62D 55/205* (2013.01); *B62D 55/21* (2013.01); *B25B 27/22* (2013.01); *B62D 55/32* (2013.01)

(58) Field of Classification Search
CPC ...... B62D 55/20; B62D 55/205; B62D 55/21; B62D 55/211
See application file for complete search history.

(56) References Cited

U.S. PATENT DOCUMENTS

| | | | | |
|---|---|---|---|---|
| 1,789,814 A | * | 1/1931 | George | B62D 55/20 305/198 |
| 2,008,214 A | | 7/1935 | Knox | |
| 3,171,695 A | | 3/1965 | Schick | |
| 3,680,928 A | * | 8/1972 | Kraschnewski | B62D 55/12 305/196 |
| 4,083,611 A | | 4/1978 | Schaffner et al. | |
| 4,132,063 A | * | 1/1979 | Craig | B23P 19/027 29/402.06 |
| 4,139,240 A | * | 2/1979 | Profio | B62D 55/062 29/891.1 |
| 4,278,301 A | * | 7/1981 | Gregor | B62D 55/26 305/111 |
| 4,433,874 A | * | 2/1984 | Melvin | B62D 55/32 305/204 |
| 4,995,678 A | * | 2/1991 | Jinkens | B62D 55/205 305/204 |
| 5,409,306 A | | 4/1995 | Bentz | |
| 8,540,325 B2 | * | 9/2013 | Diekevers | B62D 55/21 305/104 |

(Continued)

FOREIGN PATENT DOCUMENTS

| | | |
|---|---|---|
| DE | 3629613 | 3/1988 |
| WO | 2016153842 | 9/2016 |
| WO | 2017068687 A1 | 4/2017 |

*Primary Examiner* — Jason R Bellinger
(74) *Attorney, Agent, or Firm* — Law Office of Kurt J. Fugman LLC

(57) ABSTRACT

A track chain member includes a shoe member, and a first rail member extending from the shoe member. The first rail member includes a first lug defining a first bore defining a first longitudinal axis and including a first bushing retention shelf disposed in the first bore, a second lug including a second bushing retention shelf disposed in the second bore. A third lug extends in a direction opposite that of the first lug and second lug and is disposed axially between the first lug and the second lug.

13 Claims, 4 Drawing Sheets

(56) References Cited

U.S. PATENT DOCUMENTS

| | | | |
|---|---|---|---|
| 9,016,809 B2* | 4/2015 | Kowalski | B62D 55/21 |
| | | | 305/15 |
| 2017/0021879 A1 | 1/2017 | Thorson et al. | |
| 2017/0050688 A1* | 2/2017 | Oertley | B62D 55/32 |
| 2017/0057572 A1 | 3/2017 | Hakes et al. | |
| 2019/0329831 A1* | 10/2019 | Restifo | B62D 55/202 |

* cited by examiner

TRACK PIN AND BUSHING RETENTION DESIGN FOR A TRACK CHAIN

TECHNICAL FIELD

The present disclosure relates to track chains that use pins and bushings to hold the track chain together while still allowing one track chain member such as a track link or track pad to rotate relative to another track link or track pad. Specifically, the present disclosure relates to a pin and bushing retention design used to hold track chain members such as track shoes, track pads or track links together, helping to prevent the pin or bushing from falling out of the track chain members.

BACKGROUND

In many current applications, track chain members such as track links, track pads or track shoes are attached to each other using a pin and bushing that allows the track chain members to rotate relative to each other while still allowing the chain to remain in tension when installed on the undercarriage of a track type vehicle. If the pin or bushing becomes loose or otherwise falls out of the bores of the track chain members, the track chain will fall off the undercarriage of the track type vehicle, requiring maintenance in the field that may be difficult and costly. To help prevent this from happening, different devices have been employed to retain the pin and bushing in the bores of the track chain members.

In particular, track bushings may tend to "walk", that is to say, the bushing may become freed from its constraint, whether it be welded or press fit into place. So, the bushing begins to move under loads exerted on the track chain such that it moves axially out of the bore.

In particular applications, the track bushing may be a spring pin that is expanded and welded within the bore of a track pad or other type of track chain member. The expansion and welding operations can cause imperfections within the welded joint as well as high tensile residual stresses. These two factors may combine with one another, leading to weld cracking and inevitably track pad failure.

Accordingly, it is desirable to prevent the walking of a track bushing or pin in a manner that has not yet been devised in the art.

SUMMARY

A retention device for retaining a track pin or track bushing in the bore of a track chain member is provided according to an embodiment of the present disclosure. The pin retention device comprises a fastener defining a longitudinal axis, a first end and a second end along the longitudinal axis, a head at the first end and a threaded portion at the second end. A tubular spacer defining a thru-hole configured to receive the fastener may also be provided that is configured to abut the bushing or the track pin, being spaced away from bushing or track pin a minimum distance of 10 mm or less.

A track chain member according to an embodiment of the present disclosure is provided. The track chain member may comprise a shoe member, and a first rail member extending from the shoe member. The first rail member may include a first lug defining a first bore defining a first longitudinal axis and including a first bushing retention shelf disposed in the first bore, a second lug defining a second bore defining a second longitudinal axis and including a second bushing retention shelf disposed in the second bore. The first lug and the second lug may extend parallel and spaced apart from each other with the first longitudinal axis aligned with the second longitudinal axis, forming a female yoke. A third lug may extend in a direction opposite that of the first lug and second lug, the third lug defining a third bore defining a third longitudinal axis parallel to the second longitudinal axis. The third lug is disposed axially between the first lug and the second lug along the third longitudinal axis.

A track chain assembly according to an embodiment of the present disclosure is provided. The track chain assembly may comprise a plurality of track chain segments and at least one track chain segment includes two track chain members and a track pin defining a longitudinal axis, a first end and a second end along the axis, the pin connecting the track chain members together. Each of the plurality of track chain segments may include a first track chain member comprising a first shoe member, and a first rail member extending from the shoe member. The first rail member may include a first lug defining a first bore defining a first longitudinal axis and including a first bushing retention shelf disposed in the first bore, a second lug defining a second bore defining a second longitudinal axis and including a second bushing retention shelf disposed in the second bore, the first lug and the second lug extending parallel and spaced apart from each other with the first longitudinal axis aligned with the second longitudinal axis, forming a first female yoke. A third lug may be provided that extends in a direction opposite that of the first lug and second lug, the third lug defining a third bore defining a third longitudinal axis parallel to the second longitudinal axis. The third lug may be disposed axially between the first lug and the second lug along the third longitudinal axis. A second track chain member may also be provided comprising a second shoe member, and a second rail member extending from the shoe member. The second rail member may include a fourth lug defining a fourth bore defining a fourth longitudinal axis and including a fourth bushing retention shelf disposed in the fourth bore, a fifth lug defining a fifth bore defining a fifth longitudinal axis and including a fifth bushing retention shelf disposed in the fifth bore, the fourth lug and the fifth lug extending parallel and spaced apart from each other with the fourth longitudinal axis aligned with the fifth longitudinal axis, forming a second female yoke. A sixth lug may be provided that extends in a direction opposite that of the fourth lug and fifth lug, the sixth lug defining a sixth bore defining a sixth longitudinal axis parallel to the fifth longitudinal axis. The sixth lug may be disposed axially between the fourth lug and the sixth lug along the sixth longitudinal axis, and a first bushing member may be disposed in the first bore surrounding the track pin, and a second bushing may disposed in the second bore surrounding the track pin, and a third bushing member may be disposed in the sixth bore surrounding the track pin.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
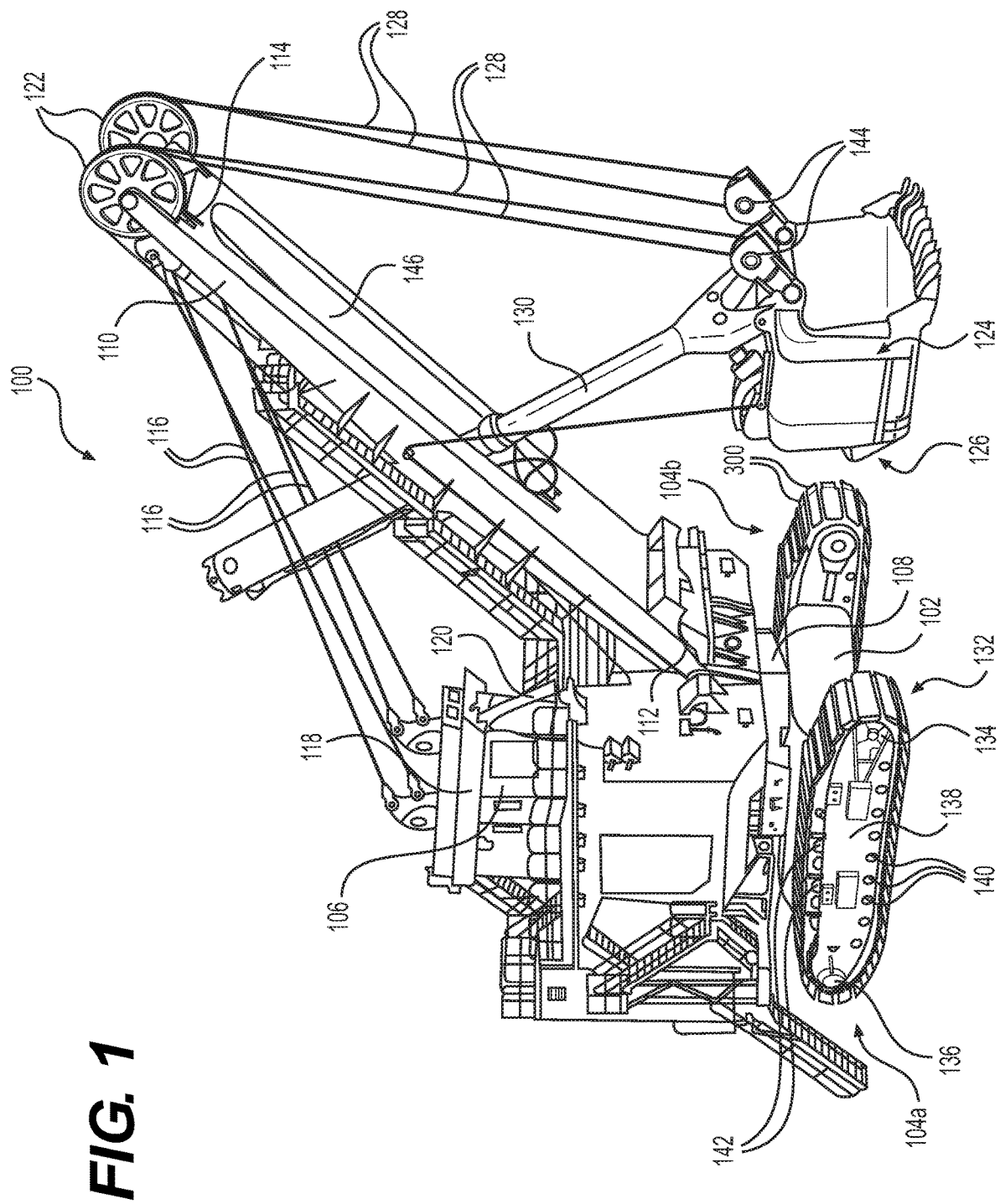
FIG. 1 is a perspective view of a machine such as an electric rope shovel that has track chains that use an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100a, 100b etc. It is to be understood that the use of letters immediately after a reference number indicates that these features are similarly shaped and have similar function as is often the case when geometry is mirrored about a plane of symmetry. For ease of explanation in this specification, letters will often not be included herein but may be shown in the drawings to indicate duplications of features discussed within this written specification.

Various embodiments of the present disclosure include a track pin bushing retention design for a track chain that may include a retention device that includes a bolt, washer, nut and spacer that are positioned near the longitudinal end of a track pin. This may prevent the track pin from egressing out of a track pin bore found in a track chain member while the track chain is in used on a machine. Also, bushing retention shelves may be provided to help prevent "walking" of the bushing out of the bores of the lugs of a track chain member such as a track pad.

Referring to FIG. 1, there is shown a machine 100 having a frame 102 (may include a turntable 108) with a track system, including a first track chain 104a and a second track chain 104b positioned at opposite sides of frame 102. Machine 100 is shown in the context of an electric rope shovel having an operator cab 106, a boom 110, a lower end 112 of the boom 110 (also called a boom foot), an upper end 114 of the boom 110 (also called a boom point), tension cables 116, a gantry tension member 118, a gantry compression member 120, a sheave 122 rotatably mounted on the upper end 114 of the boom 110, a dipper bucket 124, a dipper door 126 pivotally coupled to the dipper bucket 124, a hoist rope 128, a winch drum (not shown), and a dipper handle 130. An electric motor controls the winch drum, causing the lower or raising of the boom, dipper bucket, and upward and downward movement of the dipper handle relative to the boom.

Tracks 104a and 104b are part of a machine undercarriage 132 coupled with frame 102 in a conventional manner. Each of tracks 104a and 104b include a plurality of coupled together track shoes forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 may also be associated with each of tracks 104a and 104b to support and guide the tracks opposite rollers 140 during operation.

Tracks 104a and 104b are part of a machine undercarriage 132 coupled with frame 102 in a conventional manner. Each of tracks 104a and 104b include a plurality of coupled together track shoes 60 forming endless loops extending about a plurality of rotatable elements. In a typical design, an idler 134 and a drive sprocket 136 will be associated with each of tracks 104a and 104b and mounted to a track roller frame 138. A plurality of track rollers 140 may also be mounted to roller frame 138, and are associated with each of tracks 104a and 104b to support machine 100 and guide tracks 104a and 104b in desired paths, as further described herein. One or more carrier rollers 142 may also be associated with each of tracks 104a and 104b to support and guide the tracks opposite rollers 140 during operation.

The unique design of tracks 104a and 104b and the overall track and undercarriage system of which they are a part are contemplated to enable machine 100 to operate in certain environments such as soft underfoot conditions without the shortcomings associated with many earlier designs. While use in the machine environment of an excavator is emphasized herein, it should be understood that machine 100 might comprise a different type of machine. For instance, track-type tractors or even half-track machines are contemplated herein. Further still, machine 100 might consist of a conveyor or other type of machine wherein tracks are used for purposes other than as ground engaging elements. Also, the machine might be some type of hydraulic shovel, bull dozer, excavator, back hoe, etc.

The dipper bucket 124 is suspended from the boom 110 by the hoist rope 128. The hoist rope 128 is wrapped over the sheave 122 and attached to the dipper bucket 124 at a bail 144. The hoist rope 128 is anchored to the winch drum (not shown). The winch drum is driven by at least one electric motor (not shown) that incorporates a transmission unit (not shown). As the winch drum rotates, the hoist rope 128 is paid out to lower the dipper bucket 124 or pulled in to raise the dipper bucket 124. The dipper handle 130 is also coupled to the dipper bucket 124. The dipper handle 130 is slidably supported in the saddle block 146, and the saddle block 146 is pivotally mounted to the boom 110 at the shipper shaft (not clearly shown). The dipper handle 130 includes a rack and tooth formation thereon that engages a drive pinion (not shown) mounted in the saddle block 146. The drive pinion is driven by an electric motor and transmission unit (not shown) to extend or retract the dipper handle 130 relative to the saddle block 146.

An electrical power source (not shown) is mounted to the frame 102 to provide power to a hoist electric motor (not shown) for driving the hoist drum, one or more crowd electric motors (not shown) for driving the crowd transmission unit, and one or more swing electric motors (not shown) for turning the turntable 108. In some cases, electric motor powers all of the moving components of the shovel. Each of the crowd, hoist, and swing motors is driven by its own motor controller, or is alternatively driven in response to control signals from a controller (not clearly shown).

Figure 2:
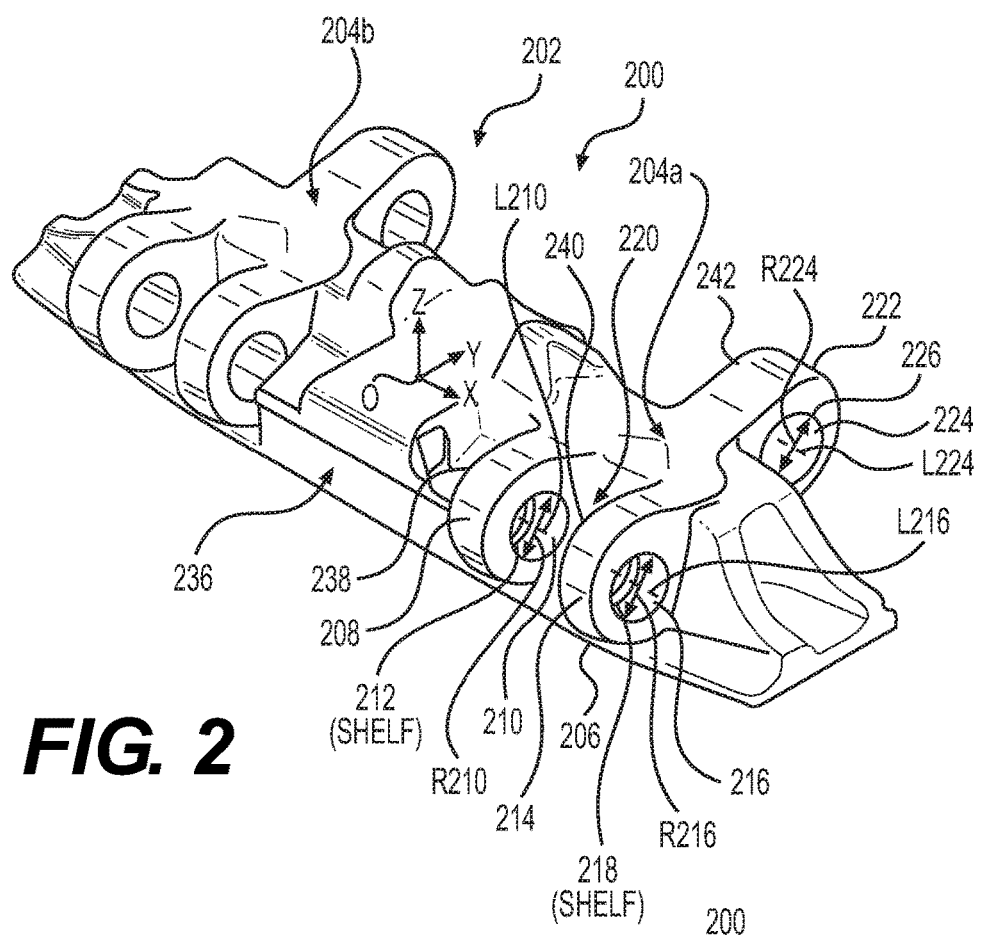
FIG. 2 is a perspective view of track chain member such as a track pad according to an embodiment of the present disclosure that may be used with the machine of FIG. 1.

Looking now at FIG. 2, a track chain member 200 in the form of a track pad 202 according to an embodiment of the present disclosure is shown. A track pad 202 includes integrally formed track link or rail members 204 and a shoe member 206. In other embodiments, the track rail member 204 may be separate from the shoe member 206, etc.

As shown in FIG. 2, a track chain member 200 may comprise a shoe member 206, and a first rail member 204a extending from the shoe member 206 in a general vertical direction as shown in FIG. 2 as the shoe member 206 is shown in a lower vertical position as would be the case when the shoe member 206 is contacting a flat work surface or ground surface.

The first rail member 204a includes a first lug 208 defining a first bore 210 defining a first longitudinal axis L210. A first bushing retention shelf 212 is disposed in the first bore 210. Similarly, the first rail member 204a further includes a second lug 214 defining a second bore 216 defining a second longitudinal axis L216. A second bushing retention shelf 218 is disposed in the second bore 216. The first lug 208 and the second lug 214 extend parallel and spaced apart from each other with the first longitudinal axis L210 aligned with the second longitudinal axis L216, forming a female yoke 220. More specifically, the first and second lugs 208, 214 extend horizontally in the same direction and are spaced axially apart from each other along a direction parallel to the first longitudinal axis L210. The first rail member 204a further comprises a third lug 222 extending in a horizontal direction opposite that of the first lug 208 and the second lug 214, the third lug 222 defining a third bore 224 defining a third longitudinal axis L224 parallel to the second longitudinal axis L216. The third lug 222 is disposed axially between the first lug 208 and the second lug 214 along the third longitudinal axis L224. Hence, when similar or identical track pads 202 are assembled together to form a track chain 104a, 104b the third lug 222 of one track pad 202 will fit snugly between the first and second lugs 208, 214 of another track pad 202, allowing a rotating joint to be formed.

Figure 5:
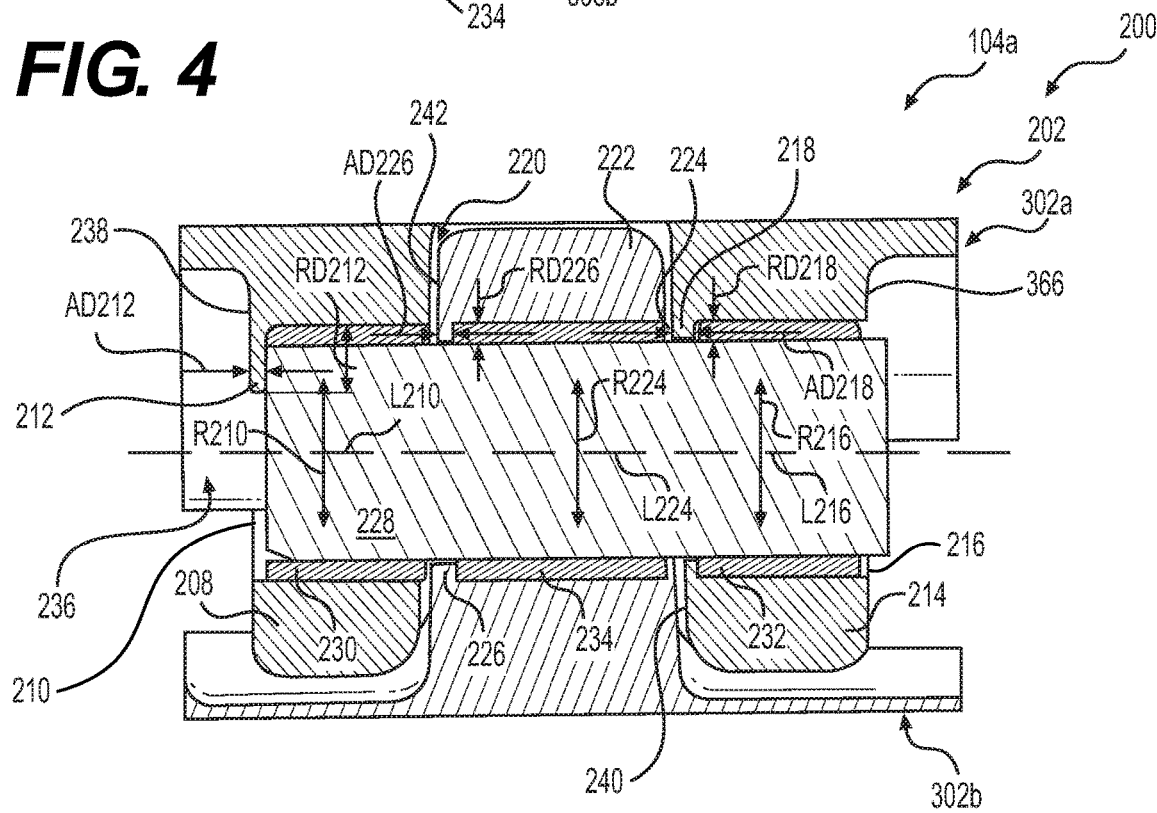
FIG. 5 is an enlarged top view of the track pin and track bushing installed into the bores of the lugs of the track pads of FIG. 4.

Looking at FIGS. 2 and 5, the third lug 222 may include a third bushing retention shelf 226 disposed in the third bore 224, similar to the first and second lugs 208, 214. The first bore 210, the second bore 216 and the third bore 224 have cylindrical configurations defining a first radial direction R210 of the first bore 210, a second radial direction R216 of the second bore 216, and a third radial direction R224 of the third bore 224. Third bushing retention shelf 226 extends radially the same amount (see RD226) as the second bushing retention shelf 218 (see RD218) while the first bushing retention shelf 212 extends further radially (see RD212) than the second or third bushing retention shelves 218, 226. This difference in the amount of the radial extension RD226 of the third bushing retention shelf 226 and the corresponding extension RD218 of the second bushing retention shelf 218 as compared to the first bushing retention shelf 212 allows the first bushing retention shelf 212 to retain both the track pin 228 and the first bushing member 230 (best seen in FIG. 5) while the second and third bushing retention shelves 218, 226 are intended to retain the second and third bushing members 232, 234 only. More specifically, the first bushing retention shelf 212 prevents the track pin 228 and first bushing member 230 from passing through the first lug 208 toward the center portion 236 of the track pad 202. In other embodiments, all the bushing retention shelves may be identically configured.

The configuration of the first, second and third bushing retention shelves 212, 218, 226 may be annular about the longitudinal axis L210, L216, L224 of the respective bore 210, 216, 224. Other configurations are possible in other embodiments. The axial thickness AD212, AD218, AD226 of the first, second, and third bushing retention shelves 212, 218, 226 may be relatively the same and may range from 10 mm to 20 mm in certain embodiments (best seen in FIG. 5), and may be 15 mm (+/−4 mm) in certain embodiments. In other embodiments, the thickness may be greater than 20 mm. The radial extension RD212 of the first bushing retention shelf 212 may range from 6 mm to 12 mm in certain embodiments, while the radial extension RD218, RD226 of the first and second bushing retention shelves 218, 226 may range from 3 mm to 9 mm in certain embodiments. Any of the dimensions discussed herein may be varied as needed or desired to differ from any value specifically mentioned herein in other embodiments.

The track chain member 200 may further comprise a second rail member 204b identically configured to the first rail member 204a, spaced axially away from the first rail member 204a along the first longitudinal axis L210. A Cartesian coordinate system X, Y, Z is shown in FIG. 2 with its origin O placed at the center of mass (centroid) of the track pad 202 and its X axis parallel with the longitudinal axes L210, L216, L224. The track pad 202 is symmetrical about the X-Z plane. This may not be the case in other embodiments.

With continued reference to FIG. 2, the first lug 208 defines a first inner axial side surface 238, the second lug 214 defines a second inner axial side surface 240, and the third lug 222 defines a third inner axial side surface 242. The first bushing retention shelf 212 is disposed along the first inner axially side surface 238, the second bushing retention shelf 218 is disposed along the second inner axially side surface 240, and the third bushing retention shelf 226 is disposed along the third inner axial side surface 242. As a result of this construction, the first bushing member 230 (see FIG. 5) is inserted and pressed into the first bore 210 from a direction oriented from the axial outer portion of the track pad 202. Likewise, the second bushing member 232 and third bushing member 234 are also inserted and pressed into the second bore 216 and third bore 224 respectively from axial outer portion the track pad 202. Installing the bushing members from the axial outer portion of the track pad is easier than doing it from the center portion 236 of the track pad 202.

Figure 3:
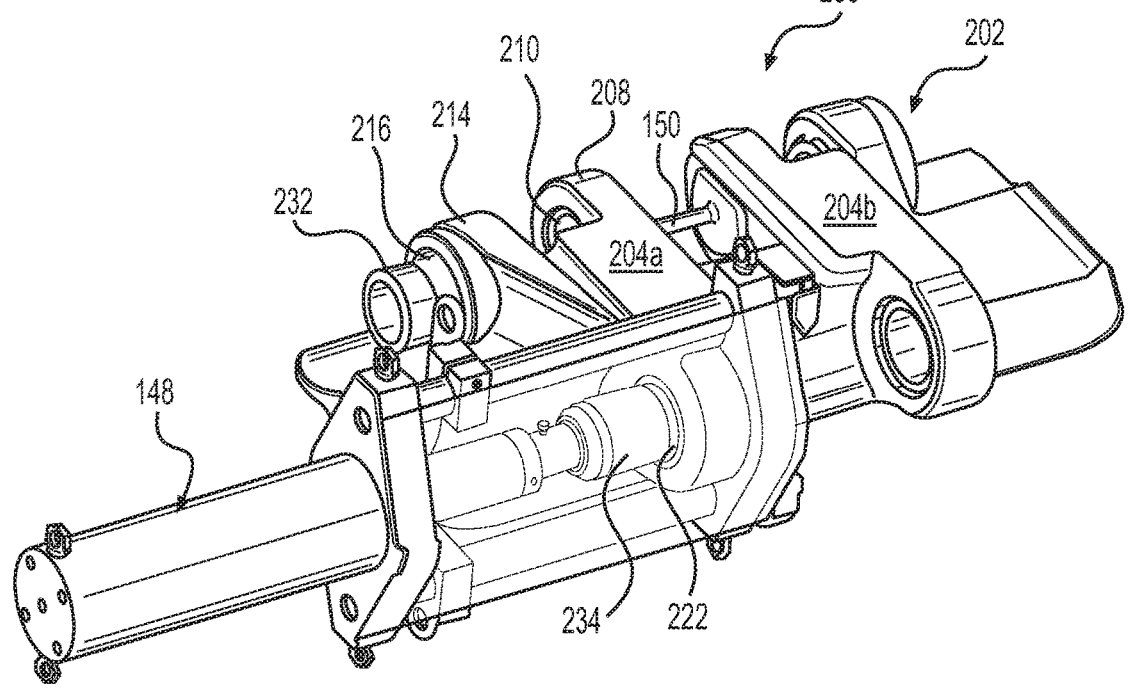
FIG. 3 is a perspective view illustrating the pressing of a track pin bushing into a bore of a track chain member similar to that of FIG. 2 using a hydraulic pressing device according to an embodiment of the present disclosure.

As depicted by FIG. 3, the bushing members 230, 232, 234 may be pressed into the bores 210, 216, 224 of a track chain member 200 using a hydraulic pressing device 148. A brace 150 may be span between two rail members 204a, 204b to provide support so that the rail members do not bend during the pressing operation. Then, the track pins 228 may be inserted into the bores 210, 216, 224 using a similar hydraulic device 148.

Figure 4:
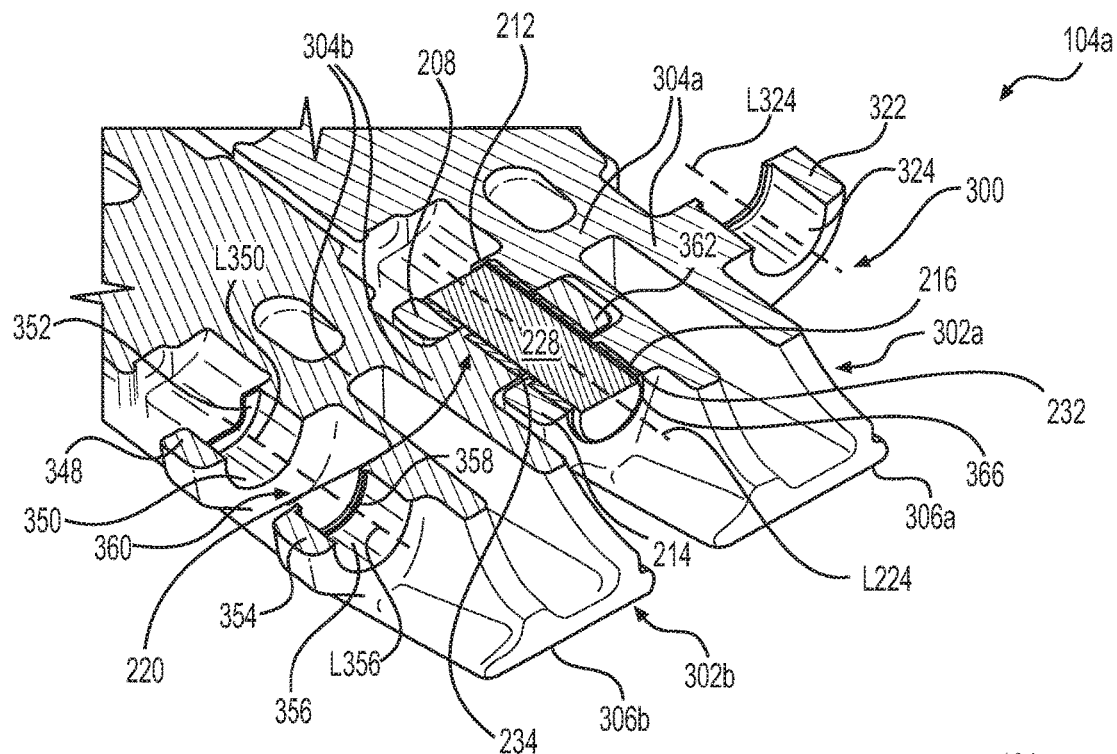
FIG. 4 is a cross-sectional view of a track chain segment showing the track pin and bushing installed into the bores of two mating track chain members such as track pads similar to the track pad of FIG. 2.

Focusing now on FIGS. 4 and 5, a track chain assembly 104a, 104b according to an embodiment of the present disclosure will now be described. The track chain assembly 104a, 104b may comprise a plurality of track chain segments 300 and at least one track chain segment 300 includes two track chain members 302a, 302b that are connected together via a track pin 228 defining a longitudinal axis (understood to be coextensive or collinear with longitudinal axis L224), a first end 244 and a second end 246 along this axis. Each of the plurality of track chain segments 300 of the track chain assembly 104a, 104b includes a first track chain member 302a comprising a first shoe member 306a, and a first rail member 304a extending from the shoe member 306a.

The first rail member 304a may include a first lug 208 defining a first bore 210 defining a first longitudinal axis L210 and including a first bushing retention shelf 212 disposed in the first bore 210, and a second lug 214 defining a second bore 216 defining a second longitudinal axis (understood to be coextensive or collinear with longitudinal axis L224) and including a second bushing retention shelf 218 disposed in the second bore 216. The first lug 208 and the second lug 214 may extend parallel and spaced apart from each other with the first longitudinal axis L210 aligned with the second longitudinal axis (understood to be coextensive or collinear with longitudinal axis L224), forming a first female yoke 220. The first rail member 304a may further comprise a third lug 322 extending in a direction opposite that of the first lug 208 and the second lug 214, the third lug 322 defining a third bore 324 defining a third longitudinal axis L324 parallel to the second longitudinal axis. The third lug 322 may be disposed axially between the first lug 208 and the second lug 214 along the third longitudinal axis L324.

The track chain assembly 104a, 104b may further comprise a second track chain member 302b comprising a second shoe member 306b, and a second rail member 304b extending from the shoe member 306b, wherein the second rail member 304b includes a fourth lug 348 defining a fourth bore 350 defining a fourth longitudinal axis L350 and including a fourth bushing retention shelf 352 disposed in the fourth bore 350, a fifth lug 354 defining a fifth bore 356 defining a fifth longitudinal axis L356 and including a fifth bushing retention shelf 358 disposed in the fifth bore 356. The fourth lug 348 and the fifth lug 354 extending parallel and spaced apart from each other with the fourth longitudinal axis L350 aligned with the fifth longitudinal axis L356, forming a second female yoke 360.

The second rail member 304b may further include a sixth lug 362 extending in a direction opposite that of the fourth lug 348 and fifth lug 356, the sixth lug 362 defining a sixth bore 364 defining a sixth longitudinal axis (understood to be coextensive or collinear with longitudinal axis L224) parallel to the fifth longitudinal axis L356. The sixth lug 362 is disposed axially between the fourth lug 348 and the sixth lug 362 along the sixth longitudinal axis L364. A first bushing member 230 may be disposed in the first bore 210 surrounding the track pin 228, a second bushing 332 may be disposed in the second bore 216 surrounding the track pin 228, and a third bushing member 334 may be disposed in the sixth bore 364 surrounding the track pin 228.

The third lug 322 may be axially aligned along the third longitudinal axis L324 with the sixth lug 362. Furthermore, the first lug 208 may be axially aligned along the first longitudinal axis with the fourth lug 348 and the second lug 214 may be axially aligned along the second longitudinal axis with the fifth lug 354. In particular embodiments, the first track chain member 302a may be identically configured as the second track chain member 302b. This may not be the case in other embodiments.

In some embodiments, the track pin 228 may abut or may nearly abut the first bushing retention shelf 212. Also, the second lug 214 may define a first outer axial side surface 366 and the track pin 228 may extend axially past the first outer axial side surface 366 along the second longitudinal axis. The diameter of the track pin may be approximately 114 mm in certain embodiments. In other embodiments, the diameter of the pin may be approximately 138.5 mm. The diameter of the pin may be varied as needed or desired in other embodiments of the present disclosure and is not limited to any specific value mentioned herein.

The sixth bore 364 may define a sixth bushing retention shelf 226, the first bushing member 230 may be disposed axially between the first bushing retention shelf 212 and the third bushing retention shelf 226, and the third bushing member 334 may be disposed axially between the third bushing retention shelf 226 and the second bushing retention shelf 218.

The first lug 208 may define a first inner axial side surface 238, the second lug 214 may define a second inner axial side surface 240, and the sixth lug 362 may define a third inner axial side surface 242 and the first bushing retention shelf 212 is disposed adjacent the first inner axial side surface 238, the second bushing retention shelf 218 is disposed adjacent the second inner axial side surface 240, and the sixth bushing retention shelf 226 is disposed adjacent the third inner axial side surface 242.

Figure 6:
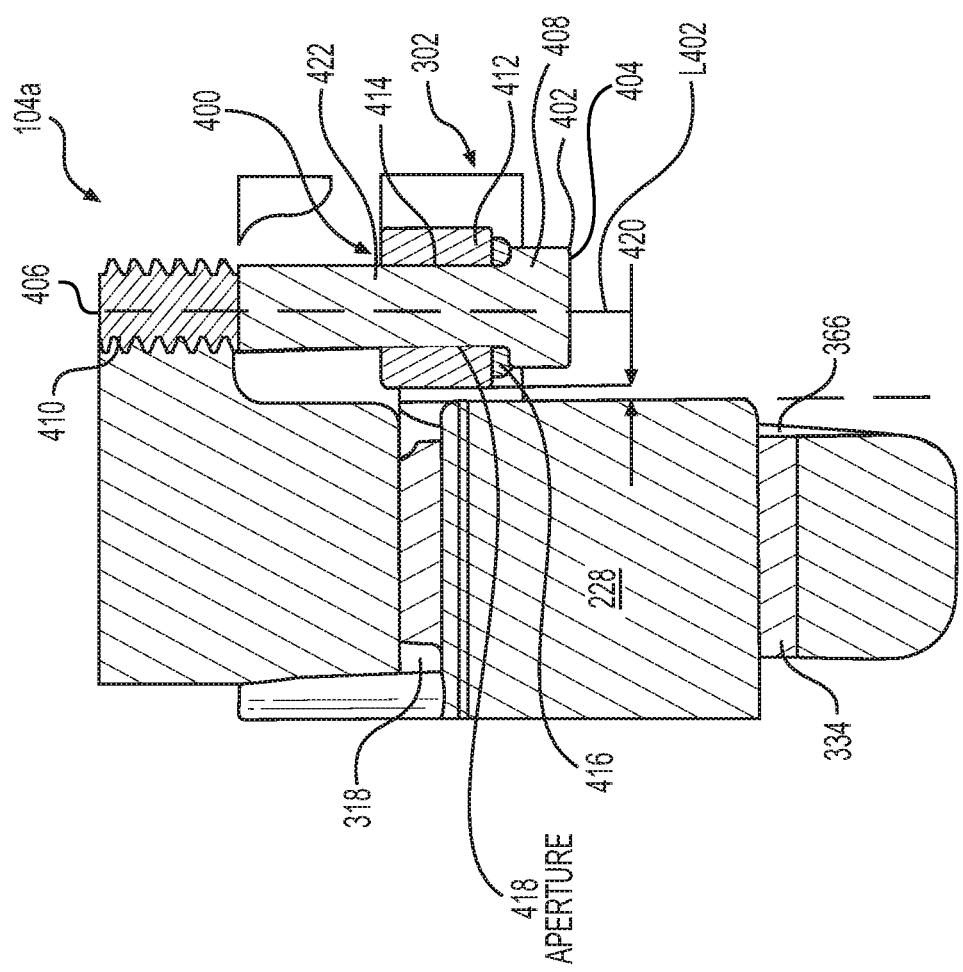
FIG. 6 is enlarged top view of the track pin and bushing of FIG. 5 being retained in the bores of the lugs of the track pads by a retention device.

As shown in FIG. 6, the track chain assembly 104a, 104b may further comprise a retention device 400 disposed adjacent the first outer axial side surface 366 and the third bushing member 234 may be disposed axially between the second bushing retention shelf 218 and the retention device 400.

The retention device 400 may comprise a fastener 402 defining a longitudinal axis L402, a first end 404 and a second end 406 along the longitudinal axis L402, a head 408 at the first end 404 and a threaded portion 410 at the second end 406, and a shank portion 422 therebetween. A tubular spacer 412 defining a thru-hole 414 configured to receive the fastener 402 and the tubular spacer 412 is configured to limit axial movement of both the track pin 228 and the third bushing member 234.

In some embodiments, a washer 416 may be disposed between the head 408 and the tubular spacer 412. The washer 416 defines a central aperture 418 that is configured to receive the fastener 402.

In certain embodiments, the tubular spacer 412 is configured to abut the bushing 334 or the track pin 228, being spaced away from bushing 234 or track pin 228 the minimum distance 420 of 10 mm or less. In some embodiments, the minimum distance 420 may be less than 7.5 mm and may be approximately 6.9 mm in certain embodiments.

The fastener 402 may be a bolt that includes a hexagonally shaped head 408 that is passes through the track chain member 200, 302 and is retained using a nut (not shown). In other embodiments, the threaded portion 410 of the fastener 402 may engage the track chain member 200, 302 (threaded thereto) directly.

In some applications, the fastener 402 extends completely through the track chain member 200, 302 and the nut (not shown) may be loosely threaded onto the threaded portion 410 of the fastener (402) and then tack welded thereto to prevent unintentional loss of the nut (not shown).

Other types and configurations of retention devices may be employed in other embodiments.

INDUSTRIAL APPLICABILITY

In practice, a track chain assembly, track chain member and/or pin retention device may be sold, manufactured, bought etc. and attached to the machine in the aftermarket or original equipment scenarios according to any of the embodiments discussed herein. That is to say, the machine may be sold with the track chain assembly, track chain member and/or pin retention device according to embodiments described herein or the machine may be retrofitted, repaired, refurbished to use any of the embodiments discussed herein. The various components including, but not limited to the track chain members, may be used from any suitable material such as cast iron, grey cast iron, steel, etc.

While the arrangement is illustrated in connection with an electric rope shovel, the arrangement disclosed herein has universal applicability in various other types of machines commonly employ track systems, as opposed to wheels. The term "machine" may refer to any machine that performs some type of operation associated with an industry such as mining or construction, or any other industry known in the art. For example, the machine may be an excavator, wheel loader, hydraulic shovel, or dragline or the like. Moreover, one or more implements may be connected to the machine. Such implements may be utilized for a variety of tasks, including, for example, lifting and loading.

For any of the embodiments discussed herein, the track chain assembly may comprise a plurality of track chain members that are similarly or identically configured. It is to be understood that at least two additional track chain members may be also provided that have different or dissimilar geometry as may be the case for two master links that are joined to the plurality of similar or identically configured track chain members, etc.

The track pads may be forged or cast from a suitably durable material such as iron, grey-iron, steel, etc. In particular embodiments, the track pads are manufactured by first casting and then the bores and associated bush retention shelves are machined before the track chain is assembled.

The use of the bushing retention shelves may help to prevent bushing members from walking. As a result, bushing members may not cross gaps or seams between mating lugs of track chain members, which could inhibit the disassembly of the track chain. In some embodiments, the bushings cannot extend more than 2 mm from the bore without causing interference from one track chain member to the adjacent track chain member.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain member comprising:
a shoe member; and
a first rail member extending from the shoe member, wherein the first rail member includes
a first lug defining a first bore defining a first longitudinal axis and including a first bushing retention shelf disposed in the first bore, a second lug defining a second bore defining a second longitudinal axis and including a second bushing retention shelf disposed in the second bore, the first lug and the second lug extending parallel and spaced apart from each other with the first longitudinal axis aligned with the second longitudinal axis, forming a female yoke; and
a third lug extending in a direction opposite that of the first lug and the second lug, the third lug defining a third bore defining a third longitudinal axis parallel to the second longitudinal axis;
wherein the third lug is disposed axially between the first lug and the second lug along the third longitudinal axis, the third lug includes a third bushing retention shelf disposed in the third bore, the first bore, the second bore and the third bores have cylindrical configurations defining a first radial direction of the first bore, a second radial direction of the second bore, and a third radial direction of the third bore, and the third bushing retention shelf extends radially the same amount as the second bushing retention shelf while the first bushing retention shelf extends further radially than the second or third bushing retention shelve.

2. The track chain member of claim 1 wherein the shoe member and the first rail member are integral with each other, forming a track pad.

3. The track chain member of claim 2 further comprising a second rail member identically configured to the first rail member, spaced axially away from the first rail member along the first longitudinal axis.

4. The track chain member of claim 3 wherein the third lug includes a third bushing retention shelf disposed in the third bore.

5. The track chain member of claim 4 wherein the first lug defines a first inner axial side surface, the second lug defines a second inner axial side surface, and the third lug defines a third inner axial side surface, and the first bushing retention shelf is disposed along the first inner axial side surface, the second bushing retention shelf is disposed along the second inner axial side surface, and the third bushing retention shelf is disposed along the third inner axial side surface.

6. A track chain assembly comprising:
a plurality of track chain segments;
at least one track chain segment includes two track chain members and a track pin defining a longitudinal axis, a first end and a second end along the axis, the pin connecting the track chain members together; and
each of the plurality of track chain segments includes
a first track chain member comprising
a first shoe member; and
a first rail member extending from the shoe member, wherein the first rail member includes
a first lug defining a first bore defining a first longitudinal axis and including a first bushing retention shelf disposed in the first bore, a second lug defining a second bore defining a second longitudinal axis and including a second bushing retention shelf disposed in the second bore, the first lug and the second lug extending parallel and spaced apart from each other with the first longitudinal axis aligned with the second longitudinal axis, forming a first female yoke; and
a third lug extending in a direction opposite that of the first lug and the second lug, the third lug defining a third bore defining a third longitudinal axis parallel to the second longitudinal axis;
wherein the third lug is disposed axially between the first lug and the second lug along the third longitudinal axis; and
a second track chain member comprising
a second shoe member; and
a second rail member extending from the shoe member, wherein the second rail member includes a fourth lug defining a fourth bore defining a fourth longitudinal axis and including a fourth bushing retention shelf disposed in the fourth bore, a fifth lug defining a fifth bore defining a fifth longitudinal axis and including a fifth bushing retention shelf disposed in the fifth bore, the fourth lug and the fifth lug extending parallel and spaced apart from each other with the fourth longitudinal axis aligned with the fifth longitudinal axis, forming a second female yoke;

a sixth lug extending in a direction opposite that of the fourth lug and fifth lug, the sixth lug defining a sixth bore defining a sixth longitudinal axis parallel to the fifth longitudinal axis;

wherein the sixth lug is disposed axially between the fourth lug and the fifth lug along the sixth longitudinal axis; and a first bushing member disposed in the first bore surrounding the track pin, a second bushing disposed in the second bore surrounding the track pin, and a third bushing member disposed in the sixth bore surrounding the track pin, and the track pin abuts the first bushing retention shelf.

7. The track chain assembly of claim 6 wherein the third lug is axially aligned along the third longitudinal axis with the sixth lug.

8. The track chain assembly of claim 7 wherein the first lug is axially aligned along the first longitudinal axis with the fourth lug and the second lug is axially aligned along the second longitudinal axis with the fifth lug.

9. The track chain assembly of claim 6 wherein the second lug defines a first outer axial side surface and the track pin extends axially past the first outer axial side surface along the second longitudinal axis.

10. The track chain assembly of claim 9 wherein the third bore defines a third bushing retention shelf, the sixth bore defines a sixth bushing retention shelf, the first bushing member is disposed axially between the first bushing retention shelf and the third bushing retention shelf, and the third bushing member is disposed axially between the third bushing retention shelf and the second bushing retention shelf.

11. The track chain assembly of claim 10 wherein the first lug defines a first inner axial side surface, the second lug defines a second inner axial side surface, and the sixth lug defines a third inner axial side surface and the first bushing retention shelf is disposed adjacent the first inner axial side surface, the second bushing retention shelf is disposed adjacent the second inner axial side surface, and the third bushing retention shelf is disposed adjacent the third inner axial side surface.

12. The track chain assembly of claim 11 further comprising a retention device disposed adjacent the first outer axial side surface and wherein the third bushing member is disposed axially between the second bushing retention shelf and the retention device.

13. The track chain assembly of claim 12 wherein the retention device comprises:

a fastener defining a longitudinal axis, a first end and a second end along the longitudinal axis, a head at the first end and a threaded portion at the second end;

a tubular spacer defining a thru-hole configured to receive the fastener and the tubular spacer is configured to limit axial movement of both the track pin and the third bushing member; and a washer disposed between the head and the tubular spacer.

* * * * *